UNITED STATES PATENT OFFICE.

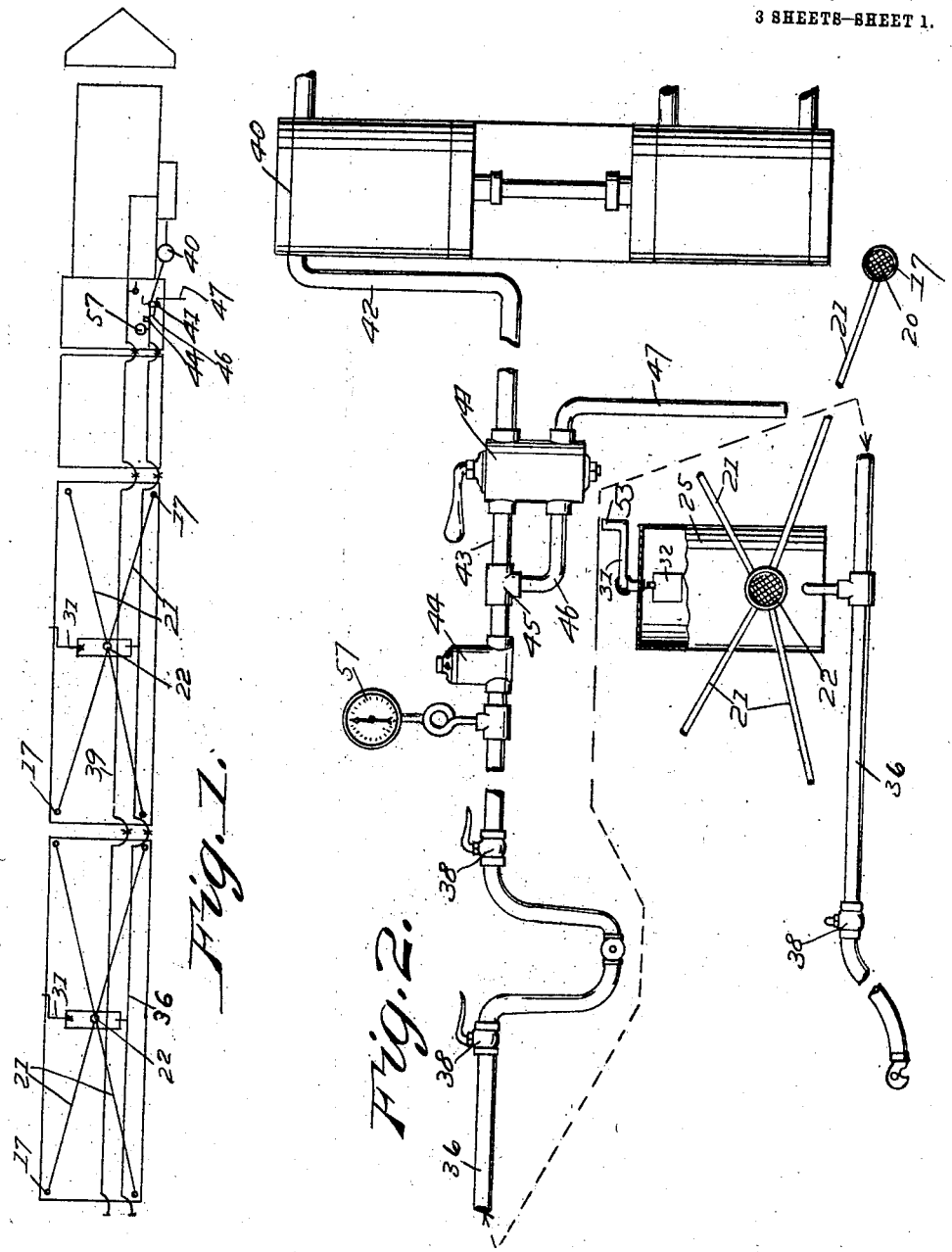

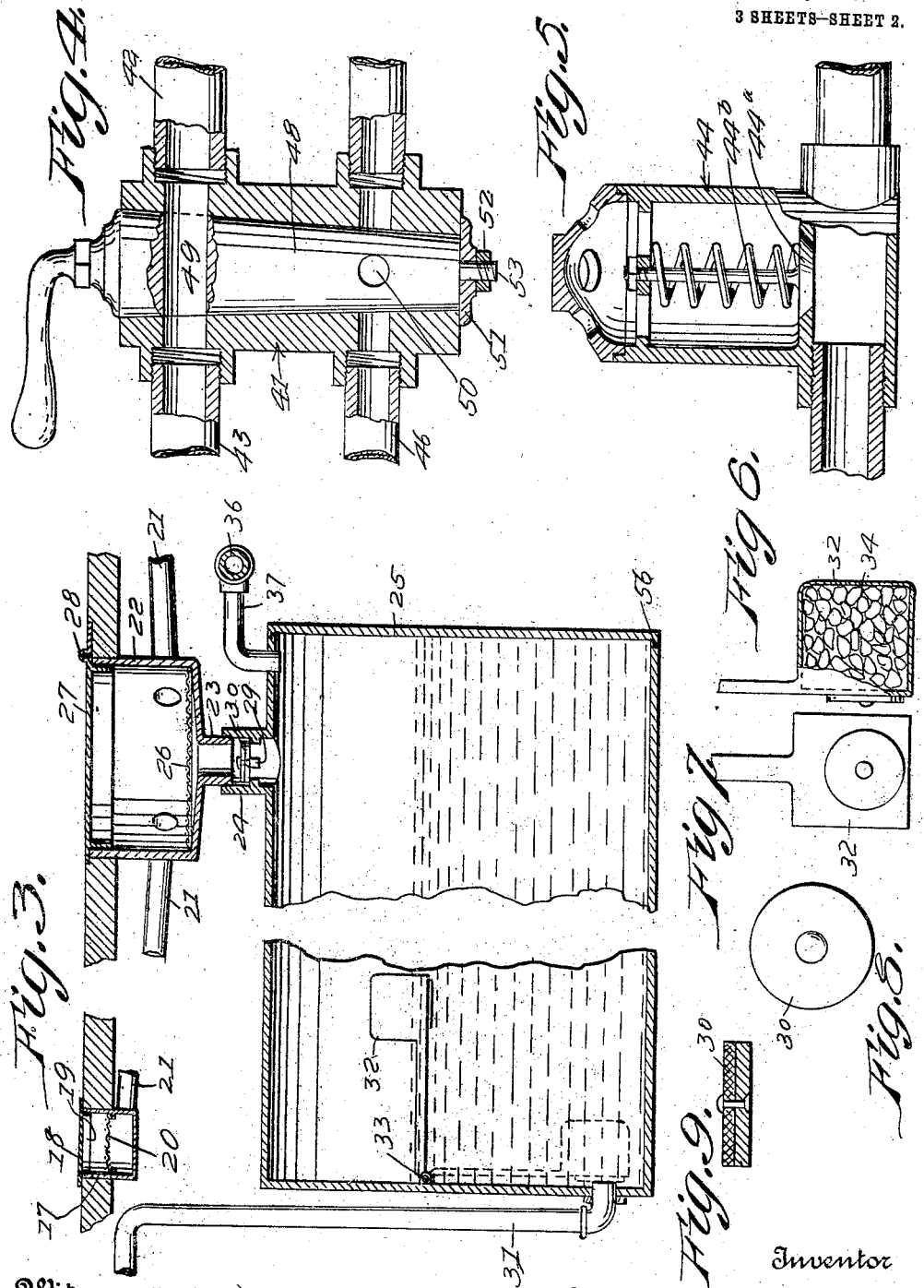

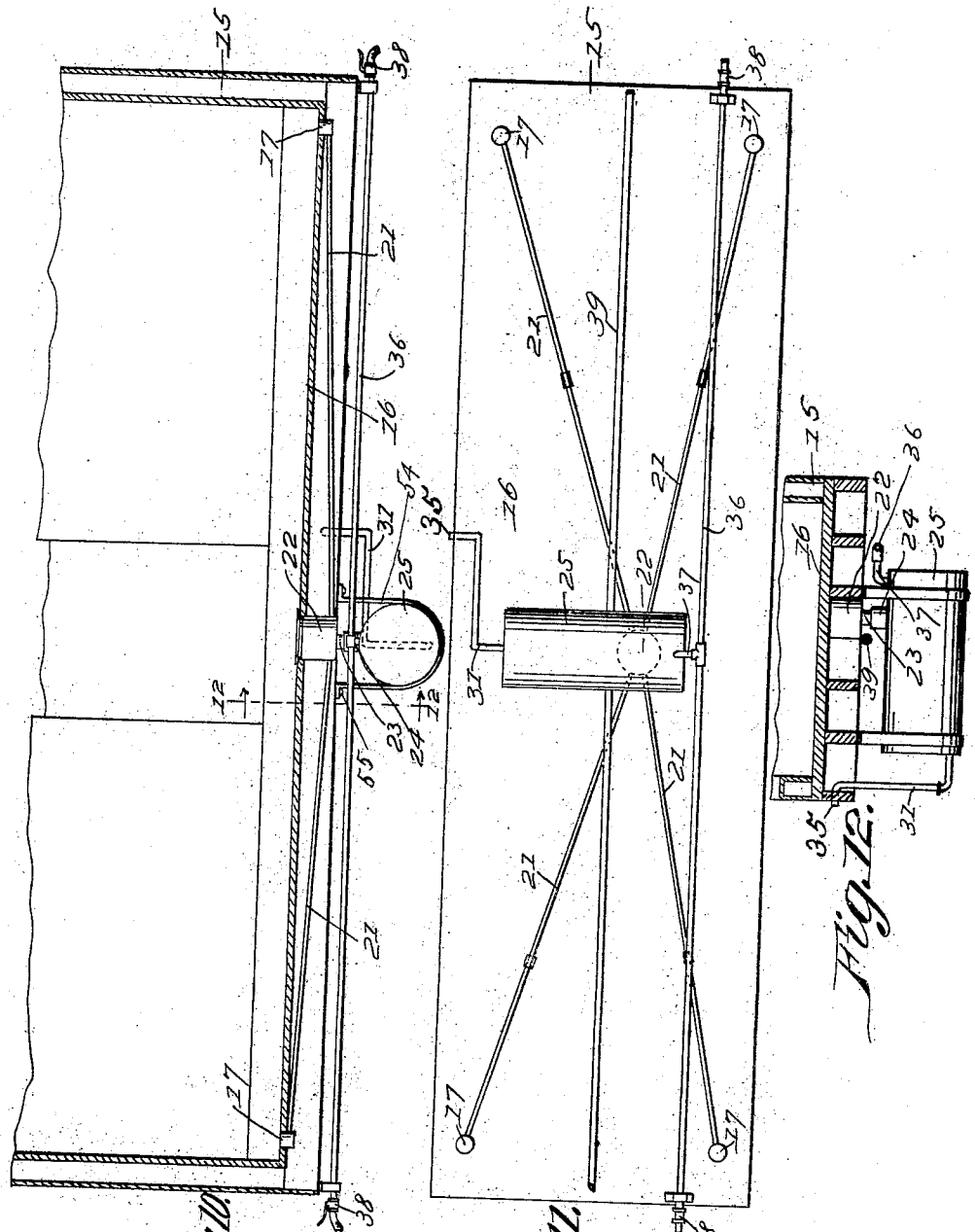

JAMES A. APPLEWHITE, OF BOYD, TEXAS, ASSIGNOR OF ONE-HALF TO W. E. REDFORD, OF BOYD, TEXAS.

PIPE SYSTEM FOR DISCHARGING WASTE WATER FROM REFRIGERATOR-CARS.

1,104,953.

Specification of Letters Patent. Patented July 28, 1914.

Application filed August 26, 1913. Serial No. 786,699.

*To all whom it may concern:*

Be it known that I, JAMES A. APPLEWHITE, a citizen of the United States of America, residing at Boyd, county of Wise, State of Texas, have invented certain new and useful Improvements in Pipe Systems for Discharging Waste Water from Refrigerator-Cars, of which the following is a specification.

This invention relates to refrigerator cars and particularly to means for discharging water from said cars which water usually accumulates from the melted ice employed for reducing the temperature.

An object of this invention is to provide novel means for collecting water from each car and for supplying pressure to discharge the water, laterally of the track and at such distance from the track as to prevent injury to the rolling stock or road bed.

Furthermore an object of this invention is to provide means for collecting the water of each car, associated with novel means for closing the passage for the admission of water while pressure is being supplied to discharge the water, novel means being furthermore provided for closing the water exit opening when the water has reached a predetermined level within a collector or receptacle into which water is delivered from the car.

A still further object of this invention is to provide an air line auxiliary to the air line of the usual air brake system, but preferably deriving its air from the same source as that of the train pipe, so that the air pump for the air brake system may be utilized for supplying air necessary to operate the water discharging system.

A still further object of this invention is to provide an air line associated with means for controlling air therethrough and for allowing the exhaust of air therefrom, the same comprising a double valve having communication with the main line and with a discharge port or tube, the said valve controlling the main line and the discharge tube and operating alternately to close and open the same, the invention further contemplating the provision of means for permitting the escape of air when the pressure is increased beyond a predetermined point, thus enabling the operator of a pump to control the said pump according to the requirements in practice.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views and in which—

Figure 1 illustrates by a diagrammatic view the installation of the air brake system and water discharging system applied to a train. Fig. 2 illustrates a view in elevation of the air pipe for the water discharging system associated with the valves and couplings of the air pump. Fig. 3 illustrates a detail sectional view of a water collecting receptacle associated with valves and couplings. Fig. 4 illustrates a sectional view of a valve associated with the air supply pipe and the air release pipe. Fig. 5 is a detail sectional view of a safety valve. Fig. 6 is a sectional view of a float valve. Fig. 7 illustrates a view in elevation of the said valve. Fig. 8 is a plan view of a valve utilized in connection with the water collector. Fig. 9 illustrates a sectional view thereof. Fig. 10 illustrates a longitudinal sectional view of a car-body with a water collecting system applied thereto. Fig. 11 illustrates an underneath plan thereof. Fig. 12 illustrates a sectional view on the line 12—12 of Fig. 10.

In these drawings 15 denotes a car-body of the usual double wall type used for refrigerator cars, the bottom 16 of which has collecting cups 17 near the four corners thereof and preferably flush with the inner surface of the floor of the car. The cups may be closed by covers 18 having flanges 19 which extend into the cups to prevent displacements of the covers, the said covers being utilized when the car is to be used for hauling material which might enter the cups and clog the same.

As shown in Fig. 3 each cup 17 has a screen 20 therein to collect foreign substances or matter which might clog the train system of which the cups are a part. Each cup has a pipe 21 extending diagonally of the car underneath thereof, which pipe 21 communicates with a collecting cup 22 depending from an aperture in the floor of the car. The collecting cup 22 has a nipple 23 that communicates with a nipple 24 forming a part of or associated with the tank 25. The collecting cup 22 has a screen 26 therein and the said collecting cup is supplied with a cover 27 hinged at 28 to the floor of the car the said cover being preferably flush with the floor surface and provided for affording access to the interior of the collecting cup, and to permit trucks to pass thereover.

The nipple 24 has lugs 29 extending from the inner wall thereof, which lugs support a valve 30, and said valve is adapted to be elevated by air pressure to close the nipple 23 when air is admitted to the tank 25 to expel the liquid therefrom, the said valve 30 unseating by gravity when the air pressure within the tank is removed, and resting on the lugs 29, in which position water may pass from the collecting cup around the periphery of the valve to the interior of the tank 25.

The tank has a water discharge pipe 31, the inner end of which may be engaged by the valve 32, which valve is applied to the interior of the tank 25 and supported by the hinge 33 so that said valve may swing freely within the tank. As shown in Fig. 6 the valve has a filling 34 which is preferably cork or other light material that will float, or the said valve may be hollow and when air-tight it would have a tendency to float when water reaches the interior of the tank. It is apparent from an inspection of Fig. 3 that the float valve will unseat and assume the position shown in full lines in said figure when water is in the tank, whereas when water is expelled from the tank the said valve will seat on the end of the pipe 31 and close the opening to prevent the escape of air which is used for expelling the water. If the float valve were not present to close the end of the pipe 31 air would escape and the operation of the air brake system might thereby be impaired. The normal position of the valve 48 when water is collecting in the tank 25 is one at right angles to that shown in Fig. 4. It is shown in Figs. 10 and 11 that the pipe 31 extends upwardly and terminates with its discharge orifice 35 at the side of the car so that the water forced from the tank is discharged laterally of the car; it being the purpose of the inventor to have the pressure on the water sufficient to force the outgoing water clear of the track and road-bed, so that said water will not damage these properties. The fact that the discharge end is above the water level prevents accidental escape of the water.

As a means for supplying air to the tank 25 I provide each car with an air pipe 36, the pipe of each car being a part of a train line for the passage of air; which train line is distinct from the train line for the air brakes. Each pipe 36 is in communication with the interior of the tank by means of a coupling 37 so that when air is on the train line of which the pipes 36 are a part, air is supplied to the interior of each tank 25. The ends of the pipes 36 have couplings of any ordinary construction, those which are usually used in air brake systems being adapted for use between the said pipes. The pipes 36 are provided at each end with a valve 38, which may be closed in the end of the pipe remote from the pump, all of the other valves in a train line, when the cars are coupled, being open to afford communication from one end of the train to the other.

In the diagrammatic view (Fig. 1) I have illustrated the air brake line 39 as parallel with the air system for discharging the water, and it will be obvious that the installation of the air discharging means will not interfere with the air brake.

The air pump 40 is connected to a double valve 41 through the pipe 42, and the valve 41 has a short pipe 43 in communication with the safety valve 44. A T-coupling 45 is interposed in the pipe 43 and said T-coupling 45 has a pipe 46 extending from it to communicate with the valve 41 at the lower end of the casing. Furthermore the casing of the valve 41 has an exhaust pipe 47 connected to it so that when the valve is operated to close the air supply line, it will open the air exhaust pipe and vice versa. The construction of the valve for effecting this result is shown in Fig. 4 in which the valve casing has a plug 48 with an upper port 49 and a lower port 50. The upper port is intended to effect a communication through the said valve between the sections of the pipe leading to the train line, whereas the port 50 is intended to effect communication between the sections of pipe constituting the exhaust for the train line. It is shown in Fig. 4 that the port 49 is at right angles to the port 50, so that when the valve plug is turned, it alternately opens and closes the pipes according to the direction or degree of movement of the plug. The plug may be held in place in any appropriate way and it is here shown as provided with a plate 51 bound against the bottom of the case by the nut 52 which nut is threaded on a stud 53 depending from the plug.

The tank 25 is removably supported in place by the stirrups or straps 54 partially embracing the tank and having their ends attached to the sills of the car by fastenings 55. One head of the tank is removably secured in place at the joint 56. The air pipe or train line is in communication with a pressure gage 57 so that the operator may supply a uniform and required pressure for forcing the water from the tank, and observe the action of the pump as it supplies the pressure within the train line.

The safety valve 44 is shown in section, Fig. 5, the same being provided with a valve 44ª held in place by a spring 44ᵇ, the said valve being unseated by an excess of pressure within the train line so that the air may escape to relieve said pressure.

I claim:

1. Improvements in cars comprising cups in the car floor, a collecting cup, means of communication between the cups whereby water from the first named cups flows into the collecting cup, a tank, means of communication between the collecting cup and the tank, a valve in said means adapted to close by pressure from within the tank, a discharge pipe for the tank, means for supplying air under pressure to the tank for expelling water therefrom, and a valve for closing the discharge pipe after water is expelled from the tank.

2. Improvements in cars comprising a car having openings in its floor, cups in said openings, pipes leading from said cups, a collecting cup into which the pipes discharge, a tank, means of communication between the collecting cup and the tank, a valve for controlling said means of communication, a discharge pipe for the tank terminating at the side of the car and above the plane of the water in the tank, a valve within the tank for closing the discharge pipe after water is expelled from the tank, and means for supplying air under pressure to the tank.

3. Improvements in cars comprising a car having openings in its floor, a collecting cup, means of communication between the openings in the floor and the collecting cup, a tank, means of communication between the collecting cup and the tank, a valve for controlling said means of communication, a discharge pipe for the tank terminating at the side of the car and above the plane of the water in the tank, a valve within the tank for closing the discharge pipe after water is expelled from the tank, an air pipe in communication with the tank, and means for supplying air to the pipe.

In testimony whereof, I affix my signature in the presence of two witnesses.

JAMES A. APPLEWHITE.

Witnesses:
 PEARL A. PUTNAM,
 E. D. B. BROWN.